United States Patent
Wada

(10) Patent No.: US 9,564,965 B2
(45) Date of Patent: Feb. 7, 2017

(54) SIGNAL MONITORING APPARATUS, SIGNAL TRANSMITTING/RECEIVING APPARATUS, AND COMMUNICATION APPARATUS

(75) Inventor: Yoshiki Wada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 34 days.

(21) Appl. No.: 14/420,146

(22) PCT Filed: Aug. 22, 2012

(86) PCT No.: PCT/JP2012/071131
§ 371 (c)(1),
(2), (4) Date: Feb. 6, 2015

(87) PCT Pub. No.: WO2014/030220
PCT Pub. Date: Feb. 27, 2014

(65) Prior Publication Data
US 2015/0222353 A1     Aug. 6, 2015

(51) Int. Cl.
*H04B 10/40*     (2013.01)
*H04B 10/079*     (2013.01)

(52) U.S. Cl.
CPC .......... *H04B 10/0795* (2013.01); *H04B 10/40* (2013.01)

(58) Field of Classification Search
CPC .......................... H04B 10/0795; H04B 10/40
USPC .................................................. 398/22, 28
See application file for complete search history.

(56) References Cited

U.S. PATENT DOCUMENTS

| | | |
|---|---|---|
| 7,324,189 B2 | 1/2008 | Ohtani et al. |
| 7,447,438 B2 | 11/2008 | Ekkizogloy et al. |
| 7,894,723 B2 | 2/2011 | Moriwaki et al. |
| 8,204,700 B2 | 6/2012 | Horiuchi et al. |
| 8,639,122 B2 | 1/2014 | Ekkizogloy et al. |
| 2006/0269283 A1 | 11/2006 | Iwadate |
| 2013/0209090 A1* | 8/2013 | Rope ............... H04B 17/003 398/25 |

(Continued)

FOREIGN PATENT DOCUMENTS

| | | |
|---|---|---|
| CN | 101069372 A | 11/2007 |
| CN | 101099315 A | 1/2008 |

(Continued)

OTHER PUBLICATIONS

International Preliminary Report on Patentability and Written Opinion issued Mar. 5, 2015 in PCT/JP2012/071131 (with English language translation).

(Continued)

*Primary Examiner* — Leslie Pascal
(74) *Attorney, Agent, or Firm* — Oblon, McClelland, Maier & Neustadt, L.L.P.

(57) ABSTRACT

A signal monitoring device, a signal transmission/reception device and a communication device, which realize easy acquisition of a diagnosis result and a signal value, and further realize fast acquisition of the diagnosis result. A signal monitoring device includes: a difference value calculator that time-sequentially calculates, for a signal to be monitored, a difference value between a signal value thereof and a previously set threshold; and a storage that updates and stores the time-sequentially calculated difference value in accordance with a previously set rule.

12 Claims, 5 Drawing Sheets

(56) References Cited

U.S. PATENT DOCUMENTS

2013/0251361 A1* 9/2013 Azadeh .................. H04B 10/40
398/22

FOREIGN PATENT DOCUMENTS

| | | |
|---|---|---|
| JP | 58-075336 A | 5/1983 |
| JP | 2004-523958 A | 8/2004 |
| JP | 2006-319893 A | 11/2006 |
| JP | 2007-173969 A | 7/2007 |
| JP | 2008-211735 A | 9/2008 |
| JP | 2009-182471 A | 8/2009 |
| JP | 2010-161525 A | 7/2010 |
| WO | WO 02/063800 A1 | 8/2002 |

OTHER PUBLICATIONS

International Search Report issued Oct. 16, 2012 in PCT/JP2012/071131 Filed Aug. 22, 2012.

Combined Chinese Office Action and Search Report issued Sep. 29, 2014 in Patent Application No. 201280003596.X (with partial English language translation).

Office Action issued Apr. 30, 2013 in Japanese Patent Application No. 2013-512893 (with English language translation).

* cited by examiner

F I G . 2
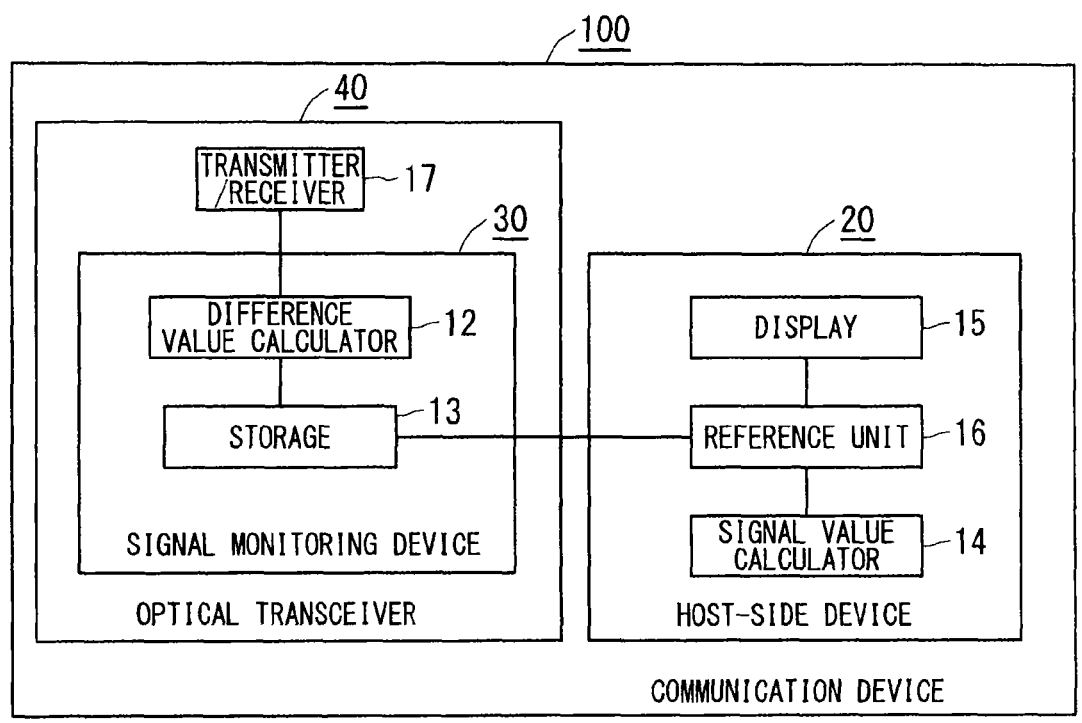

| BIT PATTERN | TWO'S COMPLEMENT EXPRESSION |
|---|---|
| 00000000 | 0 |
| 00000001 | 1 |
| ... | ... |
| 01111110 | 126 |
| 01111111 | 127 |
| 10000000 | −128 |
| 10000001 | −127 |
| 10000010 | −126 |
| ... | ... |
| 11111110 | −2 |
| 11111111 | −1 |

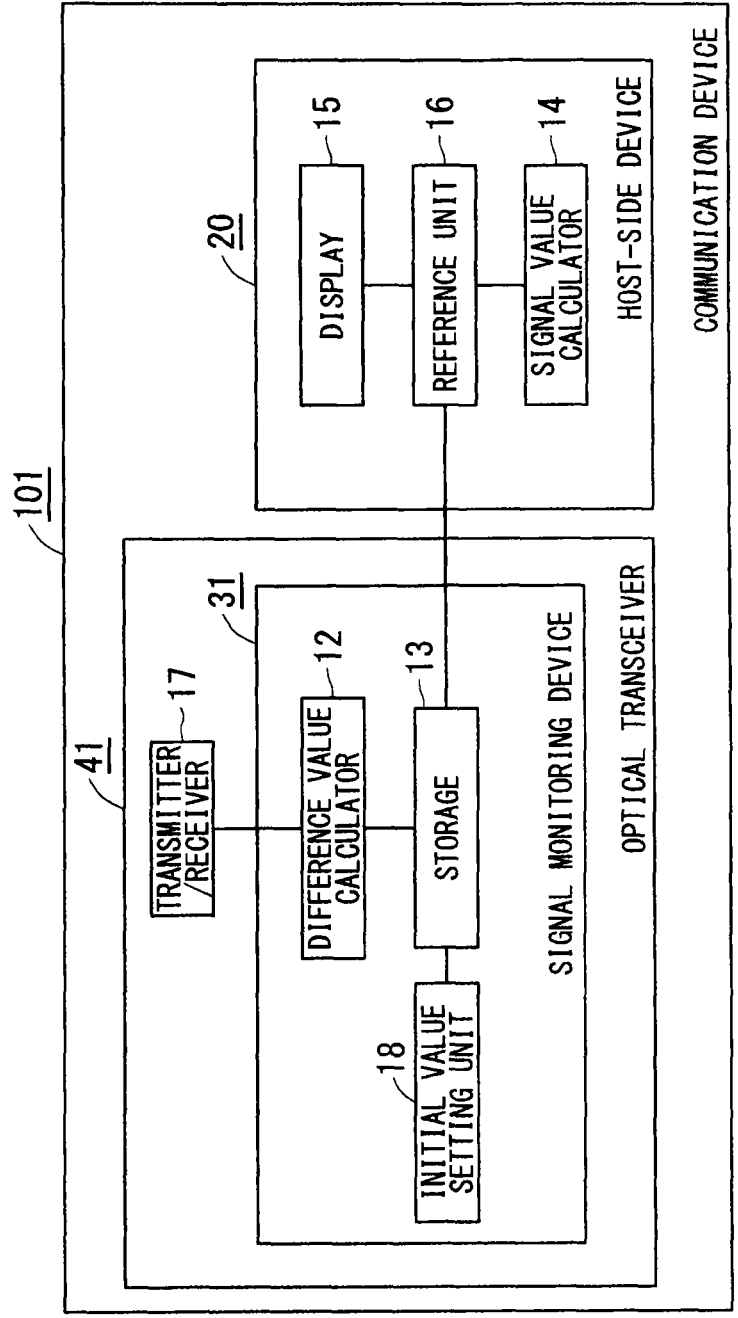
F I G . 7

SIGNAL MONITORING APPARATUS, SIGNAL TRANSMITTING/RECEIVING APPARATUS, AND COMMUNICATION APPARATUS

TECHNICAL FIELD

The present invention relates to a signal monitoring device for monitoring a signal to be monitored, a signal transmission/reception device provided with the signal monitoring device, and further a communication device provided with the signal transmission/reception device.

BACKGROUND ART

In a signal transmission/reception device such as an optical transceiver, generally, diagnosis has been performed as to whether or not a signal transmitting/receiving operation is being normally performed, thereby to enhance reliability of the operation. The diagnosis function is realized by a signal monitoring device provided inside or outside the signal transmission/reception device.

As a technique for the above diagnosis, for example, there is one where in an optical transceiver or the like, an analog signal which is a parameter concerning operation characteristics or an analog signal which is a parameter concerning an environment is converted to a digital signal, to regularly monitor the digital signal, and when it exceeds a predetermined threshold, a predetermined flag bit is generated (cf. Patent Document 1). The flag bit is information complying with the XFP standard, for example. When a request is made from an external host-side device, the presence or absence of the flag bit is reported, to allow a diagnosis result to be grasped.

Further, for example, there is one where in an optical transceiver or the like, a transmitted/received signal is regularly monitored, and a maximum value and a minimum value of the signal values are stored (cf. Patent Document 2). The optical transceiver references the maximum value and the minimum value, to perform comparison processing with a predetermined threshold, and it is thereby possible to judge whether or not the signal value has exceeded the predetermined threshold.

PRIOR ART DOCUMENTS

Patent Documents

Patent Document 1: Japanese Unexamined Patent Application Publication (Translation of PCT Application) No. 2004-523958

Patent Document 2: Japanese Patent Application Laid-Open No. 2008-211735

SUMMARY OF INVENTION

Problems to be Solved by the Invention

However, in the technique of Patent Document 1, although it is grasped from the generated flag bit that the signal value has exceeded the predetermined threshold, when the signal value itself having exceeded the threshold is to be acquired, it needs to be confirmed by referencing the signal value stored in a storage region different from that for the flag bit, and processing is thus complicated, which is problematic.

Further, in the technique of Patent Document 2, it is necessary to perform, each time, the comparison processing as to whether or not the signal value has exceeded the threshold by use of the stored maximum value and minimum value of the signal values. In this case, the larger the number of types of signals to be diagnosed becomes, the longer the processing time for obtaining the diagnosis result becomes, which is problematic.

The present invention was made in order to solve the problems as above, and has an object to provide a signal monitoring device, a signal transmission/reception device provided with the signal monitoring device, and a communication device provided with the signal transmission/reception device, which realize easy acquisition of a diagnosis result and a signal value, and further realize fast acquisition of a diagnosis result.

Means for Solving the Problems

A signal monitoring device related to one aspect of the present invention includes: a difference value calculator that time-sequentially calculates, for a signal to be monitored, a difference value between a signal value thereof and a previously set threshold; and a storage that updates and stores the time-sequentially calculated difference value in accordance with a previously set rule.

A signal transmission/reception device related to one aspect of the present invention includes: the above signal monitoring device; and a transmitter/receiver that transmits/receives a signal to be transmitted, wherein the signal to be monitored is a signal indicating an operation state of the transmitter/receiver.

A communication device related to one aspect of the present invention includes: the above signal transmission/reception device; and a host-side device provided with a reference unit that references the difference value stored in the storage of the signal monitoring device.

Effects of the Invention

According to the above aspect, there is provided the storage that updates and stores the time-sequentially calculated difference value in accordance with a previously set rule, thereby allowing easy acquisition of a diagnosis result in short processing time from a sign of the difference value. Further, performing predetermined computing based on the difference value allows easy acquisition of the signal value.

Especially according to the signal transmission/reception device related to one aspect of the present invention, there are provided the above signal monitoring device and the transmitter/receiver that transmits/receives a signal to be transmitted, and the signal to be monitored is a signal indicating an operation state of the transmitter/receiver, thereby allowing easy acquisition of a diagnosis result in short processing time from the difference value based on the signal value indicating the operation state of the transmitter/receiver. Further, performing predetermined computing based on the difference value allows easy acquisition of the signal value.

Especially, according to the communication device related to one aspect of the present invention, there are provided the above signal transmission/reception device and the host-side device including a reference unit that references the difference value stored in the storage of the signal monitoring device, whereby the difference value is referenced in the reference unit of the host-side device, to allow easy acquisition of a diagnosis result in short processing time from the difference value. Further, performing predetermined computing based on the difference value allows easy acquisition of the signal value.

An object, characteristics, aspects and advantages of the present invention will become more apparent by the following detailed descriptions and attached drawings.

BRIEF DESCRIPTION OF DRAWINGS

FIG. 2 is a diagram conceptually showing the configuration of the communication device related to the embodiment of the present invention.

FIG. 7 is a diagram conceptually showing a configuration of a modified example of the communication device related to the embodiment of the present invention.

DESCRIPTION OF EMBODIMENT

Hereinafter, an embodiment of the present invention will be described with reference to the attached drawings.
<Embodiment>
<Configuration>

Figure 1:
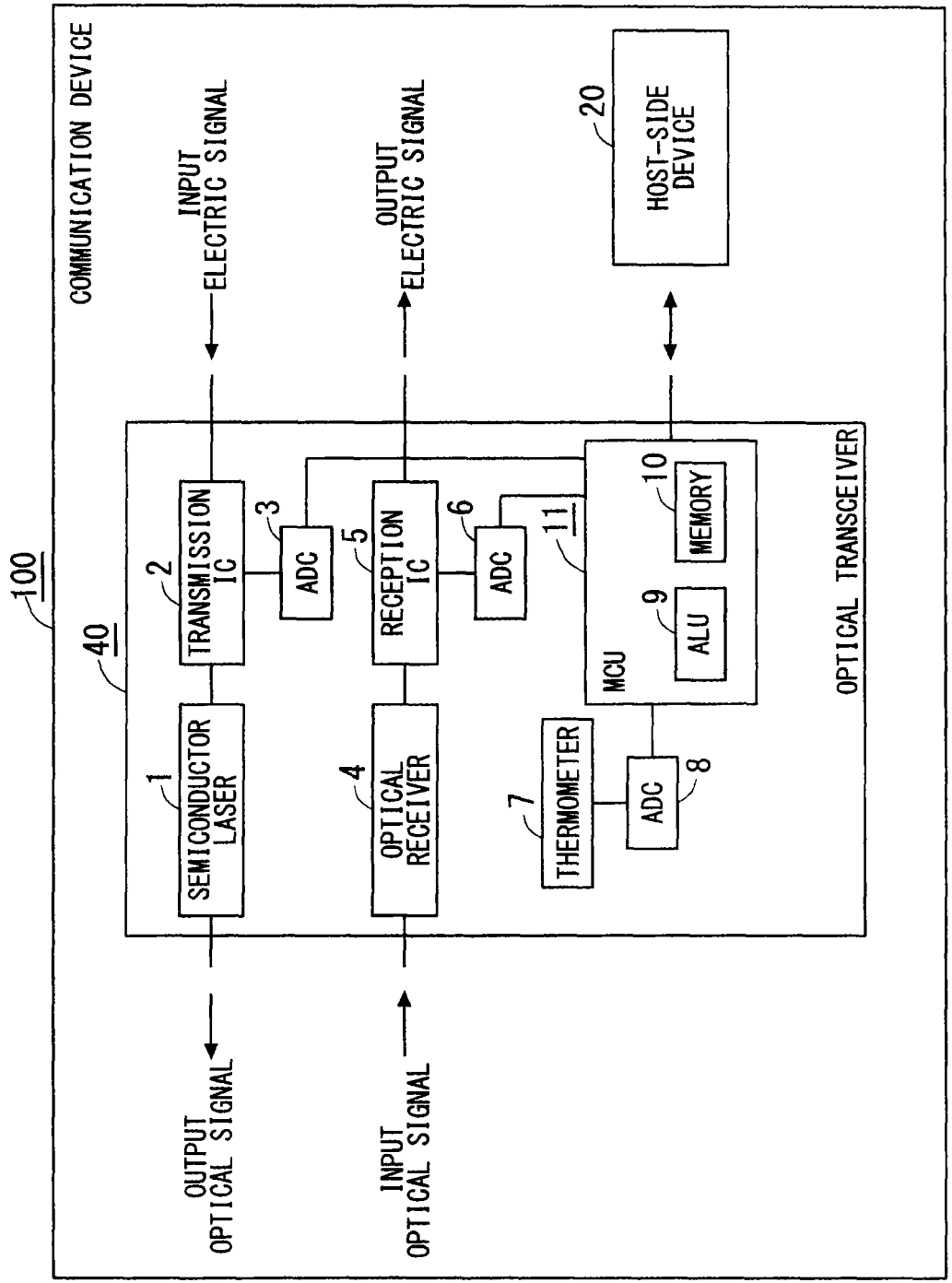
FIG. 1 is a diagram showing a configuration of a communication device provided with an optical transceiver and a host-side device related to an embodiment of the present invention.

FIG. 1 is a diagram showing a configuration of a communication device 100 provided with an optical transceiver 40 and a host-side device 20. It is to be noted that the optical transceiver 40 is one example of a signal transmission/reception device, and a signal transmitted/received in the signal transmission/reception device is not restricted to the case of including an optical signal as shown in the present embodiment.

As shown in FIG. 1, the optical transceiver 40 is provided with: a semiconductor laser device 1 that generates laser light; a transmission IC (Integrated Circuit) 2 that transmits an electric signal to the semiconductor laser device 1; an optical receiver 4 that receives an optical signal; a reception IC 5 that receives a signal outputted from the optical receiver 4; a thermometer 7 that measures a temperature of the inside (including the semiconductor laser device 1, the transmission IC 2, the optical receiver 4 and the reception IC 5) of the optical transceiver 40 or the periphery thereof; an ADC (Analog-to-Digital Converter) 3 that converts an inputted analog signal to a digital signal; an ADC 6; an ADC 8; and an MCU (Micro Controller Unit) 11 that performs an operation such as computing by use of a digital signal outputted from each of the ADC 3, the ADC 6 and the ADC 8. As the digital signal inputted into the MCU 11, for example, there are a signal indicating a temperature measured in the thermometer 7, a signal indicating a transmission bias current value, a signal indicating transmitted light output power, a signal indicating received light input power, a signal indicating a power supply voltage value, and the like.

The semiconductor laser device 1 is a device that generates predetermined laser light based on an inputted electric signal.

The optical receiver 4 is an apparatus that receives an optical signal and converts the optical signal to an electric signal.

The MCU 11 is provided with an ALU (Arithmetic and Logic Unit) 9 that performs computing, and a memory 10 that stores a computing result and the like.

In the ALU 9, it is possible to calculate as a difference value a difference between a signal value inputted from each ADC, specifically a signal value (current value, voltage value, etc.) inputted via the ADC 3 and indicating an operation state of the transmission IC 2, a signal value (current value, voltage value, etc.) inputted via the ADC 6 and indicating an operation state of the reception IC 5, and a signal value inputted via the ADC 8 and indicating a temperature measured in the thermometer 7, and a threshold previously set with respect to a type of each signal value.

In the memory 10, the difference value calculated in the ALU 9 is stored with a sign thereof included. Further, the threshold previously set with respect to the type of each signal value can also be stored.

In such a manner, the MCU 11 has the function of monitoring a signal value in the optical transceiver 40.

The host-side device 20 can access the MCU 11 of the optical transceiver 40 to reference information stored in the memory 10, and perform computing based on information acquired as necessary.

FIG. 2 is a diagram conceptually showing the configuration of the communication device 100 shown in FIG. 1.

The optical transceiver 40 is provided with a transmitter/receiver 17 that transmits/receives a signal to be transmitted which includes an optical signal, and a signal monitoring device 30 that monitors the signal value to be monitored. It is to be noted that the signal monitoring device 30 may be one which is provided outside the optical transceiver 40 as the signal transmission/reception device. The transmitter/receiver 17 is a function unit corresponding to the semiconductor laser device 1, the transmission IC 2, the optical receiver 4 and the reception IC 5 in FIG. 1, for example. Moreover, the signal monitoring device 30 is a function unit corresponding to the MCU 11 in FIG. 1, for example.

The signal monitoring device 30 is provided further with a difference value calculator 12 that calculates a difference value between the signal value of the signal to be monitored and a predetermined threshold, and a storage 13 that at least stores the difference value. The difference value calculator 12 is a function unit corresponding to the ALU 9 in FIG. 1, for example. Moreover, the storage 13 is a function unit corresponding to the memory 10 in FIG. 1, for example.

Here, although the storage 13 is shown as the function unit provided in the signal monitoring device 30 in FIG. 2, it may only be conceptually provided in the signal monitoring device 30, and a storage region of an external server or the like may be used in the signal monitoring device 30. Further, on top of the difference value, the threshold previously set with respect to each signal value may be stored in the storage 13.

The host-side device 20 is provided with: a reference unit 16 that can at least reference the difference value stored in the storage 13 of the signal monitoring device 30 and can further reference the threshold; a signal value calculator 14 that calculates (back-calculates) a corresponding original signal value based on the difference value and the threshold when the difference value and the threshold are acquired in the reference unit 16; and a display 15 that displays a warning screen or the like based on a diagnosis result acquired in the reference unit 16, and further displays the signal value calculated in the signal value calculator 14.

Here, the signal value calculator 14 may be a function unit provided in the signal monitoring device 30. In such a case, the reference unit 16 can directly reference and acquire the signal value calculated in the signal value calculator 14.

<Operation>

Figure 3:
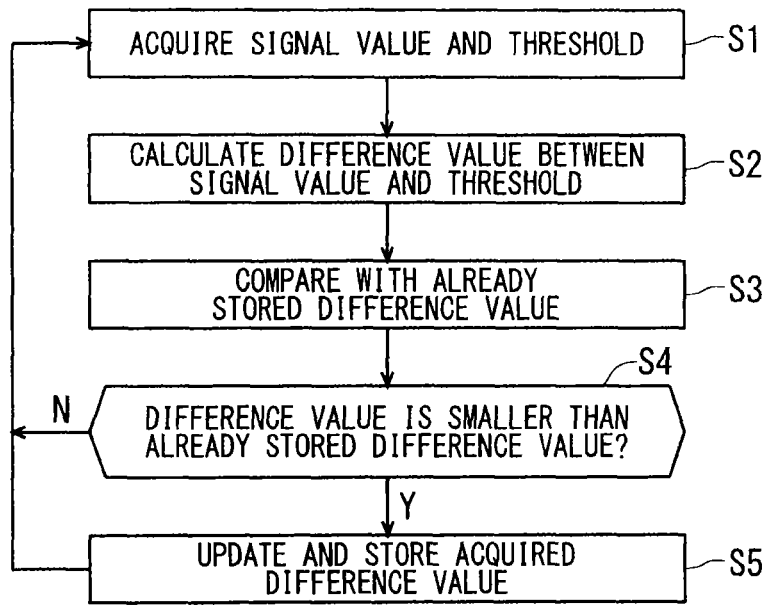
FIG. 3 is a flowchart showing an operation of an optical transceiver in the communication device related to the embodiment of the present invention.

Next, with reference to FIG. 3, a description will be given of a signal-value diagnosis operation of the optical transceiver 40 in the communication device 100 related to the present embodiment of the present invention. FIG. 3 is a flowchart showing the diagnosis operation of the optical transceiver 40 in the communication device 100.

First, in the optical transceiver 40, the difference value calculator 12 acquires from the transmitter/receiver 17 a signal value of a signal transmitted/received in the transmitter/receiver 17, and further acquires a predetermined threshold which is stored in the storage 13 or another storage region and corresponds to the acquired signal value (Step S1). Then, the difference value calculator 12 calculates a difference value between the signal value and the threshold (Step S2). Here, the difference value is a value obtained by subtracting the threshold from the signal value, or a value obtained by subtracting the signal value from the threshold, and is a value including a plus/minus sign.

In the signal-value diagnosis operation in the present embodiment, the sign of the difference value is used. That is, based on the plus/minus of the sign, a case where the signal value has "exceeded" the threshold is grasped.

Here, the case where the signal value has "exceeded" the threshold is a case where a signal value smaller than a lower-limit threshold is acquired, and a case where a signal value larger than an upper-limit threshold is acquired. In each of the cases, the above diagnosis operation can be appropriately performed when it is previously grasped which the sign of the difference value will become, plus or minus.

In the present embodiment, a description will be given of an operation in the case of grasping whether or not the lower-limit threshold has been "exceeded" (i.e., whether or not a signal value smaller than the lower-limit threshold has been acquired). It is assumed that the difference value is a value obtained by subtracting the threshold from the signal value, and when the sign of the difference value is minus, it is grasped that the signal value has "exceeded" the lower-limit threshold.

Figure 4:
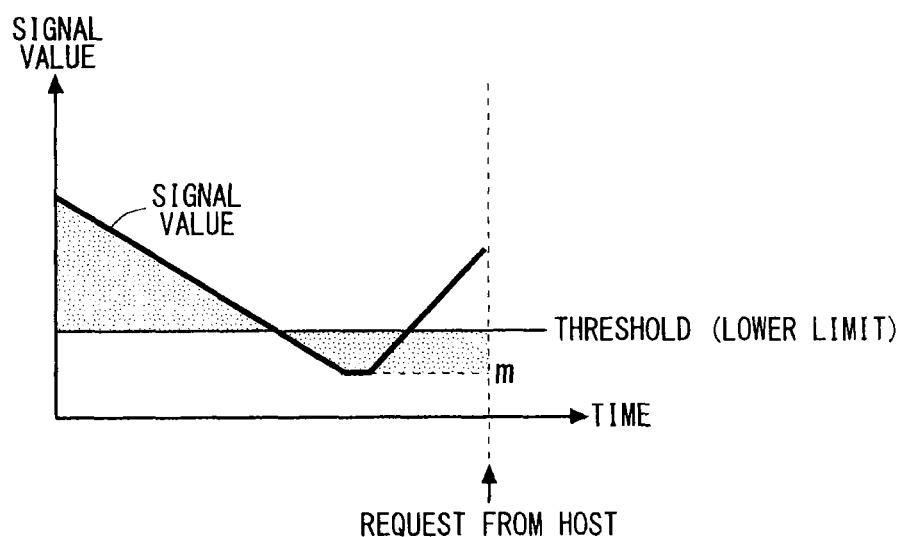
FIG. 4 is a diagram showing the relation among a signal value, a threshold (lower limit) and timing for a request from a host-side device.

FIG. 4 is a diagram showing the relation among a signal value, a threshold (lower limit) and timing for a request from the host-side device 20. In FIG. 4, a vertical axis indicates a signal value, and a horizontal axis indicates time, respectively. With reference to FIG. 4, it is found that the difference value in accordance with the above definition shifts from plus to minus and further to plus with the passage of time.

A difference value sequentially calculated along the time axis in the difference value calculator 12 is compared in the storage 13 with the difference value already stored in the storage 13 (Step S3). The first comparison operation is comparison with an initial value obtained by substituting a previously set value.

Then in the storage 13, in the case of a difference value regarding the upper-limit threshold, it is determined whether or not the acquired difference value is larger than the difference value already stored in the storage 13, and in the case of a difference value regarding the lower-limit threshold, it is determined whether or not the acquired difference value is smaller than the difference value already stored in the storage 13. That is, it is determined whether or not the acquired difference value is a difference value calculated from a signal value having greatly "exceeded" the upper-limit threshold, or whether or not the acquired difference value is a difference value calculated from a signal value having greatly "exceeded" the lower-limit threshold.

Since the difference value referred to in the present embodiment is a difference value regarding the lower-limit threshold, it is determined whether or not the acquired difference value is smaller than the difference value already stored in the storage 13 (Step S4). When the acquired difference value is smaller than the difference value already stored in the storage 13 (YES), the difference value already stored in the storage 13 is updated and the acquired difference value is stored instead. (Step S5). When the acquired difference value is larger than the difference value already stored in the storage 13 (NO), the acquired difference value is destroyed, and the processing returns to Step S1.

Therefore, when the difference value regarding the lower-limit threshold is updated and stored, only a minimum value (m value in FIG. 4), which is out of difference values (that shift from plus to minus and further to plus with the passage of time) acquired until the point of request from the host-side device 20, is to be stored in the storage 13.

The difference value stored in the storage 13 corresponds to each type of signal value whose threshold has been set, and the above update and storage are performed on each difference value of the same type.

It should be noted that in a case where the difference value regarding the upper-limit threshold is updated and stored by means of a difference value obtained by the same definition (subtracting the threshold from the signal value) as in the present embodiment, only a maximum value out of difference values acquired until the point of request from the host-side device 20 is to be stored.

Figures 5, 6:
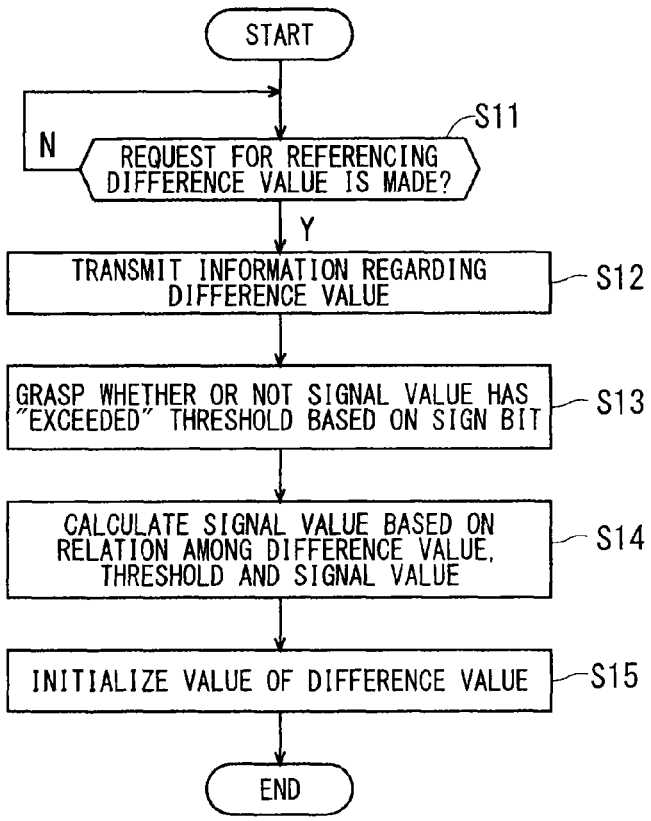
FIG. 5 is a diagram showing a bit pattern of a difference value as an example of two's complement expression.
FIG. 6 is a flowchart showing an operation of an optical transceiver in the communication device related to the embodiment of the present invention.

Here, a storage bit pattern of the difference value will be described. FIG. 5 is a diagram showing a bit pattern of a difference value as an example of two's complement expression. It is to be noted that the drawing is illustrative, and numerical values to be expressed are not required to be in this range, and may include a decimal number of values.

As shown in FIG. 5, a bit pattern showing a difference value shows a plus value when a left-end bit is 0, and it shows a minus value when the bit is 1. Since the bit (sign bit) showing the plus/minus of the difference value is present at a predetermined position as thus described, by referencing the sign bit, the plus/minus of the difference value can be easily grasped. Then, by grasping the plus/minus of the difference value, it can be grasped whether or not the signal value has "exceeded" the threshold.

Next, with reference to FIG. 6, a description will be given of an operation of the optical transceiver 40 in the communication device 100 in a case where a request for referencing the difference value is made from the host-side device 20 to the storage 13. FIG. 6 is a flowchart showing the operation of the optical transceiver 40 in the communication device 100.

First, when a request for referencing the difference value is made from the host-side device 20 to especially the signal monitoring device 30 of the optical transceiver 40 (Step S11) (YES), the signal monitoring device 30 transmits information regarding the difference value from the storage 13 to the reference unit 16 (Step S12). When the request for referencing the difference value is not made from the host-side device 20 (NO), Step S11 is repeated until the request is made.

Here, when a request from the reference unit 16 is only a request regarding whether or not the signal value has "exceeded" the threshold, it is sufficient to transmit only a bit pattern showing the plus/minus of each type of difference value (sign bit, the first bit of each bit pattern in the example shown in FIG. 5), as information regarding the difference value. In the case of performing diagnosis on a plurality of types of signal values, a bit string made up only of sign bits can be generated and transmitted.

However, when the request from the reference unit 16 is, for example, a request also including calculation of the signal value in the signal value calculator 14 provided in the host-side device 20, it is necessary to transmit each type of bit pattern (difference value bit) showing the difference value itself, including the sign bit, as information regarding the difference value.

In the reference unit 16 having received the sign bit, it is grasped whether or not the signal value has "exceeded" the threshold based on the plus/minus indicated by the sign bit (Step S13). In the present embodiment, when the sign bit is minus, it is considered that the signal value has "exceeded" the threshold. Then, for example, a warning screen showing that the signal value is abnormal, or the like, is displayed on the display 15.

In the reference unit 16, when the difference value bit is received, the signal value can further be calculated (back-calculated) in the signal value calculator 14 as in the flowchart shown in FIG. 6 (Step S14). The computing is performed based on the relation among each of the difference value, the threshold and the signal value. That is, in the present embodiment, the difference value read from the difference value bit is a value obtained by subtracting the threshold from the signal value, and hence the signal value is a value obtained by adding the difference value and the threshold. The calculated signal value is displayed on the display 15, for example.

It is to be noted that the method for displaying the signal value on the display 15 may be changed in accordance with the degree to which the calculated signal value has "exceeded" the threshold. It is considered, for example, that the display method is changed so as to emphasize implication of the warning, or further that it is changed to a display method associated with sound or the like.

Next, after at least part of the bit pattern of the difference value has been transmitted, the value of the difference value is initialized in the storage 13 (Step S15). Although the initialization may be performed by substituting a previously set value, a value with a sign, which is not a sign with which it is grasped that the signal value has "exceeded" the threshold (e.g. a plus value when it is grasped that the signal value has "exceeded" the threshold in the case of the difference value being minus), may be set as an initial value.

<Modified Example>

FIG. 7 is a diagram conceptually showing a configuration of a communication device 101 as a modified example of the communication device 100. The communication device 101 shown in FIG. 7 is provided with an initial value setting unit 18 in a signal monitoring device 31 on top of the communication device 100 shown in FIG. 2.

The initial value setting unit 18 is a function unit that sets an initial value of the difference value stored in the storage 13 to 0.

Especially in the signal monitoring device 31 of an optical transceiver 41 in the communication device 101, a value to be substituted as the difference value is set to 0 at the time of initializing the difference value in Step S15 of the flowchart shown in FIG. 6.

As already described in the above embodiment, the initialization is performed by substituting a predetermined value, but for example, when a certain plus value is to be substituted, there is required processing for reading a storage region (not shown) or the like where the value is stored. However, as shown in the present modified example, in the method where the initial value setting unit 18 directly substitutes 0, such reading processing is unnecessary. In the MCU 11 shown in FIG. 1, a special order is generally prepared to perform processing for setting a value in the storage region to 0, namely, a function unit corresponding to the initial value setting unit 18 is previously provided, and hence it is effective to use the order.

Performing the initialization by use of such a method allows fast acceleration of the initialization operation. Therefore, even when the request for the difference value from the host-side device 20 is made at short-time intervals, it is possible to appropriately perform the initialization operation and transmit a correct difference value.

<Effect>

According to the embodiment related to the present invention, the signal monitoring device 30 (or signal monitoring device 31) includes: the difference value calculator 12 that time-sequentially calculates, for a signal to be monitored, a difference value between a signal value thereof and a previously set threshold; and the storage 13 that updates and stores the time-sequentially calculated difference value in accordance with a previously set rule.

With such a configuration, a difference value sequentially calculated along the time axis is stored, and it is thereby possible to judge whether or not the signal value has "exceeded" the threshold (i.e., a diagnosis result) just by using a sign of the difference value. Further, just by performing predetermined computing based on the difference value, it is possible to acquire the signal value.

Hence it becomes possible to make the diagnosis result acquired easily in short processing time. Moreover, it is possible to make the signal value acquired without the need for referencing the signal value again.

Further, according to the embodiment related to the present invention, the signal monitoring device 31 is provided with the initial value setting unit 18 that sets an initial value of the difference value stored in the storage 13 to 0.

With such a configuration, the initialization of the storage 13 can be performed in processing time shorter than in the case of reading a specific value stored as an initial value. Therefore, even when the request for the difference value from the host-side device 20 is made at short-time intervals, it is possible to appropriately perform the initialization operation and transmit a correct difference value.

Further, according to the embodiment related to the present invention, the communication device 100 (or communication device 101) includes: the optical transceiver 40 (or optical transceiver 41) as the signal transmission/reception device; and the host-side device 20 provided with the reference unit 16 that references the difference value stored in the storage 13 of the signal monitoring device 30.

With such a configuration, it can be judged, from the sign of the referenced difference value, whether or not the signal value to be monitored has "exceeded" the threshold, and hence it becomes possible to acquire the diagnosis result easily in short processing time.

Further, according to the embodiment related to the present invention, the host-side device 20 includes the display 15 that displays a predetermined warning screen based on a reference result in the reference unit 16.

With such a configuration, it is possible to display the warning screen on the display 15 based on the diagnosis result and the signal value calculated from the difference value, so as to recognize contents of the diagnosis result and further recognize to what degree the signal value has "exceeded" the threshold from the displayed screen.

Further, according to the embodiment related to the present invention, the storage 13 further stores the threshold, the reference unit 16 references the difference value and the threshold from the storage 13, and the communication device further includes the signal value calculator 14 that back-calculates the signal value which corresponds based on the difference value and the threshold referenced in the reference unit 16.

With such a configuration, since the signal value can be calculated from the relation between the difference value and the threshold, the signal value need not be separately stored, and can be easily acquired. Since the signal value itself can be acquired, it is possible to confirm to what degree the signal value has "exceeded" the threshold, so as to appropriately grasp the degree of a defect.

In the embodiment of the present invention, material qualities and materials of the respective constitutional elements, conditions for execution, and the like have also been described, but these are illustrative, and the described ones are not restrictive.

It should be noted that in the present invention, an arbitrary constitutional element in the present embodiment can be modified or omitted within the scope of the present invention.

Although the present invention has been described in detail, the above descriptions are illustrative in all aspects, and the present invention is not restricted thereto. It is understood that countless numbers of modified examples, not shown, can be conceived without deviating from the scope of the present invention.

EXPLANATION OF REFERENCE NUMERALS 1 semiconductor laser device; 2 transmission IC; 3, 6, 8 ADC; 4 optical receiver; 5 reception IC; 7 thermometer; 9 ALU; 10 memory; 11 MCU; 12 difference value calculator; 13 storage; 14 signal value calculator; 15 display; 16 reference unit; 17 transmitter/receiver; 18 initial value setting unit; 20 host-side device; 30, 31 signal monitoring device; 40, 41 optical transceiver; 100, 101 communication device

The invention claimed is:

1. A signal monitoring device including a storage, the signal monitoring device transmits information regarding a difference value to a host-side device, the signal monitoring device comprising:
a difference value calculator that:
time-sequentially calculates, for a signal to be monitored, a difference value between a signal value thereof and a previously set threshold;
compares the time-sequentially calculated difference value with a previously store difference value in the storage; and
determines whether the time-sequentially calculated difference value is less than or greater than the previously stored difference value; and
the storage that updates and stores the time-sequentially calculated difference value based on a result of the determination.

2. The signal monitoring device according to claim 1, further comprising:
an initial value setting unit that sets an initial value of the difference value stored in the storage to 0.

3. The signal monitoring device according to claim 1, wherein the signal to be monitored is a signal indicating any of a current, a voltage, a temperature and light intensity.

4. A signal transmission/reception device comprising:
the signal monitoring device according to claim 1; and
a transmitter/receiver that transmits/receives a signal to be transmitted, wherein
the signal to be monitored is a signal indicating an operation state of the transmitter/receiver.

5. The signal transmission/reception device according to claim 4, wherein the signal transmission/reception device is an optical transceiver.

6. A communication device comprising:
the signal transmission/reception device according to claim 4; and
the host-side device provided with a reference unit that utilizes the difference value stored in the st rage of the signal monitoring device.

7. The communication device according to claim 6, wherein the reference unit utilizes a sign of the difference value stored in the storage, thereby allowing the host-side device to grasp a diagnosis result for the previously set threshold and the signal value.

8. The communication device according to claim 6, wherein the host-side device further comprises a display that displays a predetermined warning screen based on the utilized result by the reference unit.

9. The communication device according to claim 8, wherein
the storage further stores the previously set threshold,
the reference unit utilizes the difference value and the previously set threshold from the storage, and
the host-side device further comprises a signal value calculator that back-calculates the signal value which corresponds, based on the difference value and the previously set threshold utilized by the reference unit.

10. The communication device according to claim 9, wherein the display displays the signal value calculated by the signal value calculator.

11. The signal monitoring device according to claim 1, wherein the difference value is a value obtained by subtracting the previously set threshold from the signal value.

12. The signal monitoring device according to claim 1, wherein the difference value is a value obtained by subtracting the previously set threshold from the signal value, and is a value including a plus/minus sign.

* * * * *